March 7, 1939.  W. F. SMITH  2,149,983
BEARING
Filed Aug. 17, 1937
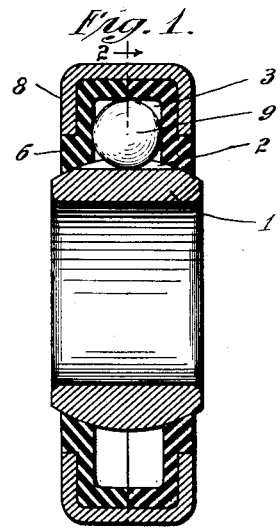
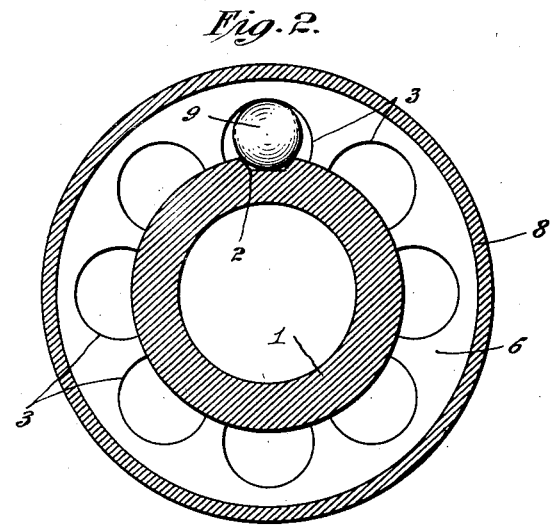
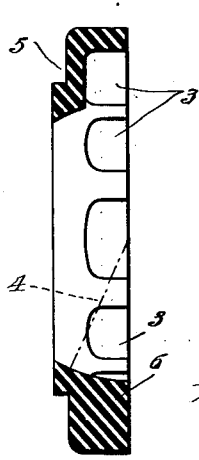
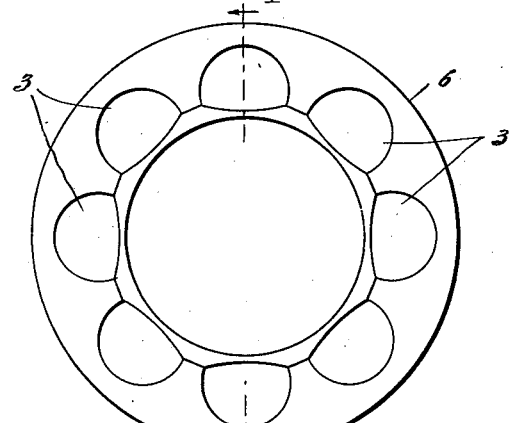
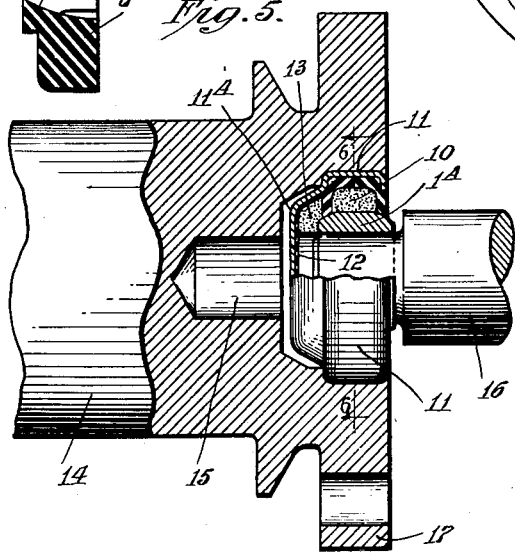
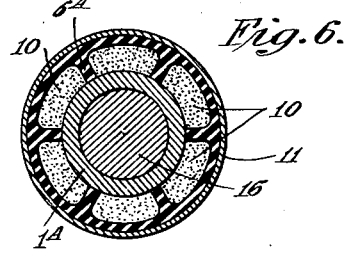
INVENTOR
W. F. Smith
BY
ATTORNEY Patented Mar. 7, 1939

2,149,983

UNITED STATES PATENT OFFICE 2,149,983

BEARING

William F. Smith, Brooklyn, N. Y.

Application August 17, 1937, Serial No. 159,457

8 Claims. (Cl. 308—72)

This invention relates to new and useful improvements in bearings and more particularly to bearings of the self-lubricating and self-aligning type.

The object of the invention is to produce a bearing of the above identified type which is simple and inexpensive to construct and assemble, e. g., without the use of screws or rivets and which is protected against heat transfer.

With this object in view, I have provided certain arrangements the nature of which will now be described as embodied in structures adapted for use as automobile clutch pilot bearings.

In the drawing Fig. 1 is a radial cross-section of my improved bearing structure;

Fig. 2 is a section along lines 2—2 of Fig. 1;

Fig. 3 is a side elevation of one-half of my improved heat insulating casing;

Fig. 4 is a section along lines 4—4 of Fig. 3;

Fig. 5 is a radial cross-section of a modification of the bearing shown in Fig. 1; and Fig. 6 is a section along lines 6—6 of Fig. 5.

Referring now to Figs. 1-4, 1 is a bushing or ring preferably made of any suitable porous lubricant absorbing material impregnated with oil and capable of absorbing additional oil from the lubricant provided in the pockets or reservoirs 3 of the surrounding case 6. This assures a continuous supply of lubricant sufficient for the useful life of the bearing without replenishment and is desirable where the inaccessible location of the bearing makes supplementary means of lubrication difficult and expensive.

The outer circumference of the bushing is preferably but not necessarily formed to a radius described from its axial center to permit self-alignment with the shaft or journal on which the bushing is provided, thereby relieving undue strain on the case 6 or bearing surfaces.

A transverse slot or groove 2 is provided in the outside of the bushing which is engaged by a steel ball 9 in one of the pockets 3. This restricts rotation of the ring 1 within the case 6 and at the same time permits, for the purpose of alignment, a limited axial rocking motion of the bushing 1 around its own center.

Figs. 3 and 4 show one-half of the case 6 made of non-metallic low heat conducting material machined or molded to the shape indicated. Each half is provided with a series of pockets 3, enclosed on two sides. The space between adjacent pockets forms ribs to reinforce the case and support the bushing. When the two parts are put together to form the case 6, the pockets 3 will be closed on all sides by the walls of casing 6 except one side which opens on and is closed by the outside surface of the bushing 1.

The inside diameter of the case 6 is formed to a radius indicated at 4 to conform to the radius to which at least part of the outside surface of the bushing 1 is formed.

The outside of the case 6 is recessed as indicated at 5 to permit firm mounting in a steel case 8 and finish flush with the side of casing 6.

When assembled, the two halves of the heat insulating case 6 enclose and support the bushing 1. The steel case 8 holds together the two halves of case 6.

In assembling the component parts the pockets 3 formed in each half of the case are filled with a suitable lubricant such as heavy oil or grease. The object of this is to form a reserve supply of lubricant which will be absorbed by the capillary action of the porous bushing 1 as the oil in the bushing is used up and dissipated by the rotating shaft. During rotation the grease is forced towards the tops of pockets 3, counteracting any tendency for leakage between the casing and the bushing.

The steel ball 9 is loosely fitted in one pocket 3 and is in contact with the groove 2 in the outside of the bushing so as to form a lock to prevent the rotation of the bushing 1 within the case 6 and still permit a limited axial movement of the bushing around its own center. This will insure alignment of the bore in the bushing with the shaft, the degree of motion being controlled by the looseness provided in the fit of the ball 9.

In the construction shown in Figs. 1-4 the bearing is open on both ends to accommodate a straight through shaft.

A preferred construction for a bearing to be applied to the end of a shaft is shown in Figs. 5 and 6. In this construction the bushing and heat insulating case may be the same as previously described and have been designated 1A and 6A. The shape of the grease pockets 10 may be modified as shown to provide somewhat greater grease space.

The steel case 11, however, not only serves to clamp together the two parts of the casing 6A but forms also a cup 11A extending beyond the width of the bushing 1A and enclosing one side. Into the cupped end 11A of the metal case is fitted a cupped washer 12 made of heat insulating material with the object of insulating the end of the bushing and shaft against ambient temperatures.

The space enclosed by the cupped end 11A of the case extending beyond the bearing proper is also utilized as a reservoir for grease. The volume of grease may be controlled so that when the bearing is rotating as a whole, e. g., as a clutch pilot bearing, the grease in pocket 11A indicated at 13 will be thrown radially outwards under the influence of centrifugal force clear of the shaft, thereby preventing leakage along the shaft journal. When rotation ceases the grease will flow down to the lowest point of the cup 11A and fill the space to a point somewhat above the center of the shaft. With the bearing mounted on a horizontal shaft, this will permit seepage of oil along the shaft to supplement the lubrication.

Figs. 5 and 6 illustrate a method of mounting my improved bearing in the end of an automobile crankshaft 14 in a counterbore 15 formed therein; 16 is the clutch shaft and 17 a flange on 14 to which the usual fly-wheel is bolted.

The bearing herein described is not restricted for use as a plain bushing. It is particularly useful in structures which are normally subject to relatively high temperatures, while the shaft is exposed to lower temperatures. In such structures the heat is readily transferred from the housing enclosing the bearing to the shaft, and the operating temperature of the bearing proper would closely approximate or even exceed that of the housing. The temperature gradient would also be influenced by the heat dissipated through the shaft. For instance, the clutch pilot bearings of automobile engines is usually mounted in or adjacent to the end of the crankshaft 14. On account of the normally high crankcase temperatures found in internal combustion engines (usually in excess of 200° F. at maximum output), the crankshaft temperature is substantially the same as that of the crankcase. A bearing located in the counterbore 15 in the end of the crankshaft 14 or in metallic contact therewith would be subject to the shaft temperatures.

Trouble is experienced in the efficient lubrication of such bearings and especially when lubricating grease is used as a lubricant because such lubricant cannot safely be exposed to temperatures in excess of 175° F. Higher temperatures cause separation of the oil and greatly accelerate the oxidation of the grease which forms a gummy residue and loses its efficiency. Where the bushing 1 contains copper the destruction of the lubricant is further accelerated by catalytic action under the influence of high temperatures.

What is claimed is:

1. In combination, a bearing ring, a steel shell around said bearing ring, a heat-insulating spacer between the ring and the shell, and means for holding said ring within but allowing limited motion with respect to said spacer, whereby the axis of the ring may be aligned at an angle to the axis of the shell.

2. In combination, a bearing ring of porous material, a steel shell around said bearing ring, a heat-insulating spacer between the ring and the shell, and means for limiting rotation of said ring with respect to said spacer, said spacer and ring having contacting surfaces formed on the same radius around the axis of the ring, whereby the ring may be axially displaced with respect to the shell.

3. In combination, a bearing ring of porous lubricant absorbent material, a steel shell partly surrounding said bearing ring, a heat-insulating spacer between the ring and the shell, and means for limiting rotation of said ring with respect to said spacer, said spacer and ring having contacting surfaces formed on the same radius around the axis of the ring, whereby the ring may be axially displaced with respect to the shell and the spacer.

4. In combination, a bearing ring of porous lubricant absorbent material, a steel shell partly surrounding said bearing ring, a heat-insulating spacer between the ring and the shell having cavities formed therein which contain lubricant, and means for limiting rotation of said ring with respect to said spacer, said spacer and ring having contacting surfaces formed on the same radius around the axis of the ring.

5. In a bearing, a bushing of porous oil absorbent material, the outside surface of which is at least partly formed on a radius around the axis of the bushing, a casing of heat-insulating material surrounding said bushing and having surfaces contacting with the outside surface of said bushing and formed on the same radius as the latter, said casing having inside cavities containing lubricant, means for limiting the rotation of said bushing with respect to said casing, and a steel shell around said casing.

6. In a bearing, a bushing of porous lubricant absorbent material the outside surface of which is at least partly formed on a radius around the axis of the bushing, said outside surface having a transverse groove, a casing of heat-insulating material assembled of two parts and surrounding said bushing, said casing having surfaces contacting with the outside surface of said bushing and formed on the same radius as the latter, each part having inside cavities which contain lubricant and when the casing is assembled form pockets opening on one side on said bushing and closed on all other sides by the walls of said casing, a ball in one of said pockets seated in said transverse groove, a cup-shaped steel shell partly surrounding and holding together said casing, the bottom portion of the shell being axially spaced from the bushing and containing lubricant, and a sheet of insulating material between the bottom portion and the bushing.

7. In combination, an automobile crank shaft having a counterbore, a clutch shaft projecting within said counterbore and surrounded near its end by a bearing comprising a bushing of porous lubricant absorbent material seated on the end of the clutch shaft and the outside surface of which is at least partly formed on a radius around the axis of the bushing, a casing of heat-insulating material surrounding said bushing and having surfaces contacting with the outside surface of said bushing and formed on the same radius as the latter, said casing having also cavities which contain lubricant, means for limiting the rotation of said bushing with respect to said casing, and a steel shell around said casing seated in said counterbore.

8. In combination, an automobile crank shaft having a counterbore, a clutch shaft projecting within said counterbore and surrounded near its end by a bearing comprising a bushing of porous lubricant absorbent material seated on the end of the clutch shaft and the outside surface of which is at least partly formed on a radius around the axis of the bushing, said outside surface having a transverse groove, a casing of heat-insulating material assembled of two parts and surrounding said bushing, said casing having surfaces contacting with the outside surface of said bushing and formed on the same radius as the latter, each part having inside cavities which contain lubricant and when the casing is assembled form pockets opening on one side on said bushing and closed on all other sides by the walls of said casing, a ball in one of said pockets seated in said transverse groove, a cup-shaped steel shell surrounding and holding together said casing seated in said counterbore, the bottom portion of the cup-shaped shell being spaced from the end of the clutch shaft and partly filled with lubricant, and a sheet of insulating material between the shell and the end of the clutch shaft.

WILLIAM F. SMITH.